United States Patent
Ehmann

(10) Patent No.: US 8,667,319 B2
(45) Date of Patent: Mar. 4, 2014

(54) SYSTEM AND METHOD FOR CLOCK CONTROL FOR POWER-STATE TRANSITIONS

(75) Inventor: Greg Ehmann, Sleepy Hollow, IL (US)

(73) Assignee: Synopsys, Inc., Mountain View, CA (US)

( * ) Notice: Subject to any disclaimer, the term of this patent is extended or adjusted under 35 U.S.C. 154(b) by 795 days.

(21) Appl. No.: 12/741,001

(22) PCT Filed: Oct. 16, 2008

(86) PCT No.: PCT/IB2008/054263
§ 371 (c)(1),
(2), (4) Date: Sep. 2, 2010

(87) PCT Pub. No.: WO2009/057008
PCT Pub. Date: May 7, 2009

(65) Prior Publication Data
US 2010/0327938 A1 Dec. 30, 2010

Related U.S. Application Data

(60) Provisional application No. 60/983,627, filed on Oct. 30, 2007.

(51) Int. Cl.
*G06F 1/04* (2006.01)
(52) U.S. Cl.
USPC ............................................ 713/600; 713/322
(58) Field of Classification Search
USPC .................................................. 713/322, 600
See application file for complete search history.

(56) References Cited

U.S. PATENT DOCUMENTS

| | | | | |
|---|---|---|---|---|
| 5,418,969 | A | * | 5/1995 | Matsuzaki et al. ............. 713/322 |
| 5,490,059 | A | * | 2/1996 | Mahalingaiah et al. ........ 700/46 |
| 5,910,930 | A | * | 6/1999 | Dieffenderfer et al. ....... 368/156 |
| 6,073,244 | A | * | 6/2000 | Iwazaki ........................ 713/322 |
| 6,393,573 | B1 | | 5/2002 | Gillespie et al. |
| 6,446,213 | B1 | | 9/2002 | Yamaki |

(Continued)

FOREIGN PATENT DOCUMENTS

| | | |
|---|---|---|
| EP | 0666526 A1 | 8/1995 |
| EP | 0666527 A1 | 8/1995 |
| EP | 1 302 858 A1 | 4/2003 |

OTHER PUBLICATIONS

GB Examination Report, GB Application No. GB1008149.5, Feb. 8, 2012, 1 page.

(Continued)

*Primary Examiner* — Chun Cao
(74) *Attorney, Agent, or Firm* — Fenwick & West LLP

(57) ABSTRACT

Clock management is implemented using a variety of systems, devices and methods. According to one embodiment a clock transitioning circuit arrangement (104) is implemented for receiving data from a processor system (102) via a data bus (212, 214) and for modifying a state a clock-generation unit (106) having a local memory for controlling a plurality of clock outputs that provide clock signals for use by the processing system (102). The arrangement has a memory circuit (206) for storing the data from the processor system (102) and a control circuit (208) for accessing the data in the memory circuit (206) in response to a request to change a clock signal provided by an output of the plurality of clock outputs and for providing corresponding data to the local memory of the clock generation unit (106).

15 Claims, 5 Drawing Sheets

(56) References Cited

U.S. PATENT DOCUMENTS

| | | | |
|---|---|---|---|
| 6,714,891 B2 | 3/2004 | Dendinger | |
| 7,055,051 B2 * | 5/2006 | Shinkawa | 713/500 |
| 7,814,344 B2 * | 10/2010 | Li | 713/300 |
| 7,996,689 B2 * | 8/2011 | Li | 713/300 |
| 2002/0026596 A1 | 2/2002 | Kim | |
| 2003/0165277 A1 * | 9/2003 | Ohashi et al. | 382/305 |
| 2004/0044915 A1 | 3/2004 | Bose et al. | |

OTHER PUBLICATIONS

PCT International Preliminary Report on Patentability, PCT Application No. PCT/IB2008/054263, May 4, 2010, 6 pages.

ISA/EP, International Search Report and Written Opinion dated Mar. 30, 2009 for PCT/IB2008/054263.

GB Examination Report, GB Application No. 1008149.5, Dec. 13, 2012, 4 pages.

* cited by examiner

SYSTEM AND METHOD FOR CLOCK CONTROL FOR POWER-STATE TRANSITIONS

This application claims benefit of priority of International Application No. PCT/IB2008/054263, filed on Oct. 16, 2008, which claims benefit of priority of U.S. Provisional Application No. 60/983,627, filed on Oct. 30, 2007. The contents of both above-mentioned applications are hereby incorporated by reference herein in their entirety.

The present invention relates generally to processor power-state transitions and, more particularly, to programmable controllers for facilitating power-state transitions through control of a clock generation unit.

Technical advances have enabled faster and more powerful processors to be used in a variety of applications. Often the increases in speed and processing power come at the expense of increased power consumption and processor size. In some applications, the increased power consumption is a potential issue, such as applications that have limited power sources. To address the concerns related to the increased power consumption, some processor systems implement one or more power saving modes. The system enters the power saving modes to save power or to reduce the amount of heat generated. Examples of such power-saving modes are taught by U.S. Pat. No. 6,714,891 (Method and Apparatus for Thermal Management of a Power Supply to a High Performance Processor in a Computer System), U.S. Pat. No. 6,393,573 (Power Management for Automotive Multimedia System) and U.S. Pat. No. 6,446,213 (Software-Based Sleep Control of Operating System Directed Power Management System with Minimum Advanced Configuration Power Interface (ACPI)-Implementing Hardware) and are fully incorporated herein by reference.

Power-saving modes are sometimes implemented by transitioning the frequency of the processor clock or by varying an input voltage of the processor. The transitions are often facilitated using hardwired circuits. These hardwired circuits can be constructed so as to require minimal control from the processor and can be designed for minimal power consumption. However, the hardwired circuits are difficult to implement because they do not allow for simple modifications after they are created. Thus, they must be redesigned whenever the transition protocol changes due to a change in the application or the processor.

The power-state transitions can also be facilitated using software executed by the main processor. This solution can be problematic because the processor must devote some of its processing time to the transition, which can cause undesirable performance issues in applications where the processor is expected to provide real-time responses. Additionally, the extra processing required by the processor consumes even more power.

These and other limitations present challenges to the implementation of processor power management.

Various aspects of the present invention are directed to methods and arrangements for implementing processor power state transitions in a manner that addresses and overcomes the above-mentioned issues.

Consistent with one embodiment of the present invention a clock transitioning circuit arrangement is implemented for receiving data from a processor system via a data bus and for modifying a state a clock-generation unit having a local memory for controlling a plurality of clock outputs that provide clock signals for use by the processing system. The arrangement has a memory circuit for storing the data from the processor system and a control circuit for accessing the data in the memory circuit in response to a request to change a clock signal provided by an output of the plurality of clock outputs and for providing corresponding data to the local memory of the clock generation unit.

Consistent with another example embodiment of the present invention, a method is implemented for use in a clock transitioning circuit arrangement. The arrangement receives data from a processor system via a data bus. The method is involves modifying a state a clock-generation unit having a local memory that controls a plurality of clock outputs and respective clock signals used by the processing system. The method includes storing the data from the processor system, accessing the stored data in response to a request to change a clock signal provided by an output of the plurality of clock outputs; and writing data corresponding to the stored data to the local memory of the clock generation unit.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

The invention may be more completely understood in consideration of the following detailed description of various embodiments of the invention in connection with the accompanying drawings, in which.

Figure 1:
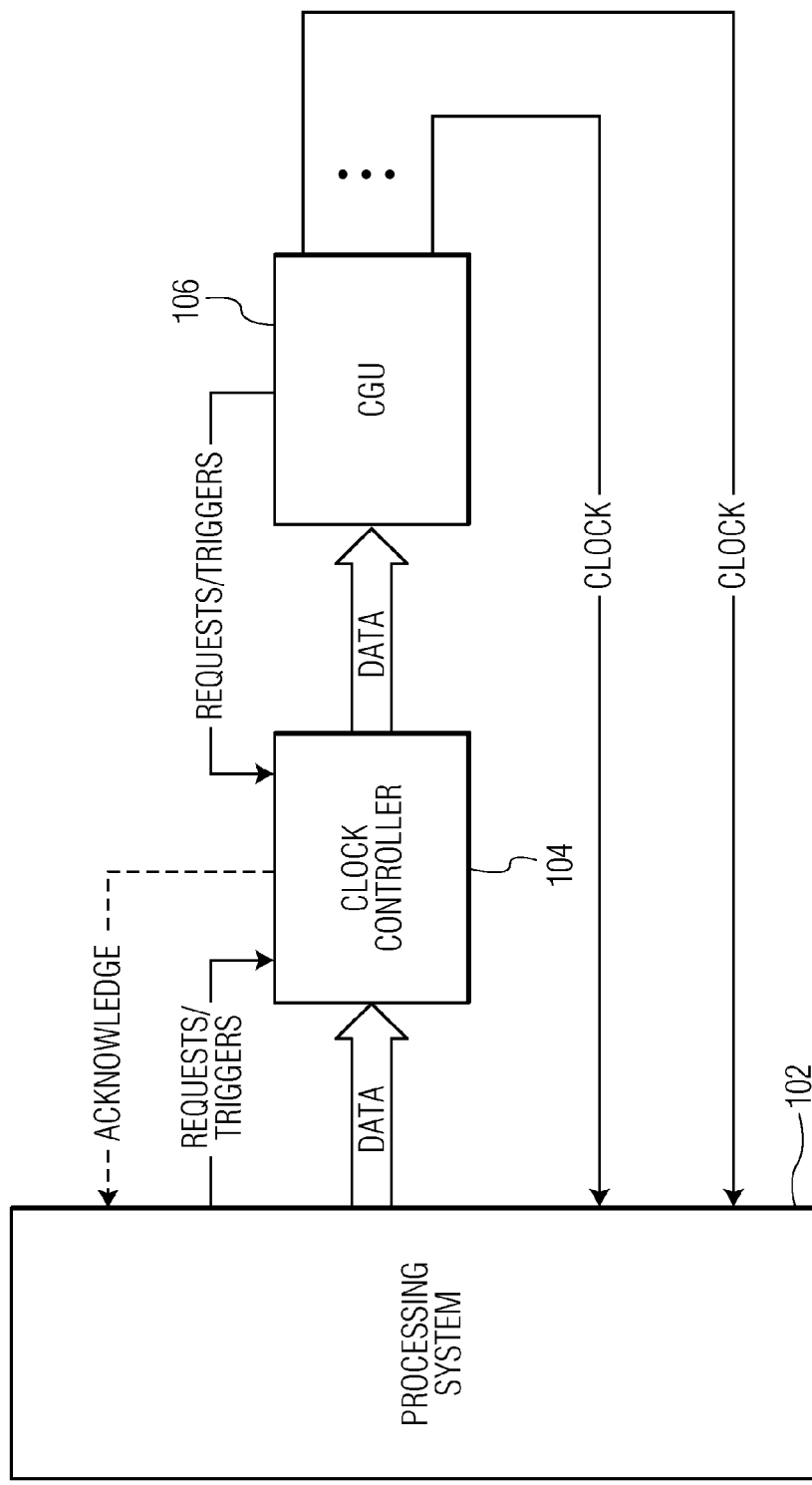
FIG. 1 shows a block diagram of a system in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving facilitating the control of a clock generation unit for power-mode transitions. While the present invention is not necessarily limited to such applications, an appreciation of various aspects of the invention is best gained through a discussion of examples in such an environment.

Consistent with an example embodiment of the present invention, a clock controller is implemented for controlling accesses to a clock generation unit (CGU). The clock controller includes a memory that can store data to be transferred to the CGU. The memory can also be used to store control information for use by the clock controller when implementing communications to the CGU. The control information can include instructions that the clock controller is to implement when controlling the CGU. Examples of the instructions include delays, handshakes and read or write accesses.

Consistent with another example embodiment of the present invention, the clock controller contains one or more memory locations that mirror register/memory locations of the CGU. This can be particularly useful for allowing the reuse of existing software drivers as they can write data to the clock controller in a manner similar to directly accessing the CGU. In a particular instance, software drivers can be implemented without direct knowledge of the clock controller using, for example, hardware translation or software translation using additional driver(s).

Consistent with yet another example embodiment of the present invention, the clock controller provides an interface for a variety of power control state machines. For instance, the system may include a plurality of processors, each of which can have distinct power states. The CGU may provide individually controllable clock signals for the processors. The frequency of the clock signals can be controlled relative to their power states (e.g., lower frequencies for increased power-savings). The memory of the clock controller can be divided into data segments for each of the processors. For each of the data segments, state machines can be used to control each clock signals relative to their respective processors.

FIG. 1 shows a block diagram of a system in accordance with an example embodiment of the present invention. Processing system 102 receives a plurality of clock signals from CGU 106. Clock controller 104 receives data from the processing system. This data can include values to be written to CGU 106 and instructions for when to write the data to CGU 106. In a specific instance, clock controller 104 is configured by processing system 102 to respond to a set of triggers. These triggers cause the clock controller 104 to access a corresponding memory location. In some instances, the clock controller 104 can provide acknowledgment back to the processing system 102 once a condition has been met, such as once data has been written to CGU 106 or after a delay that indicates that the clock signals of CGU 106 should be stable. The triggers can also be received from the CGU 106. Such triggers can provide information about the CGU, such as status indicators of the current state of the clock signals. In a particular instance, the processing system implements a dynamic frequency and voltage sequencing technique (DFVS) to save power. This includes control over clock frequencies and voltage levels.

Figure 2:
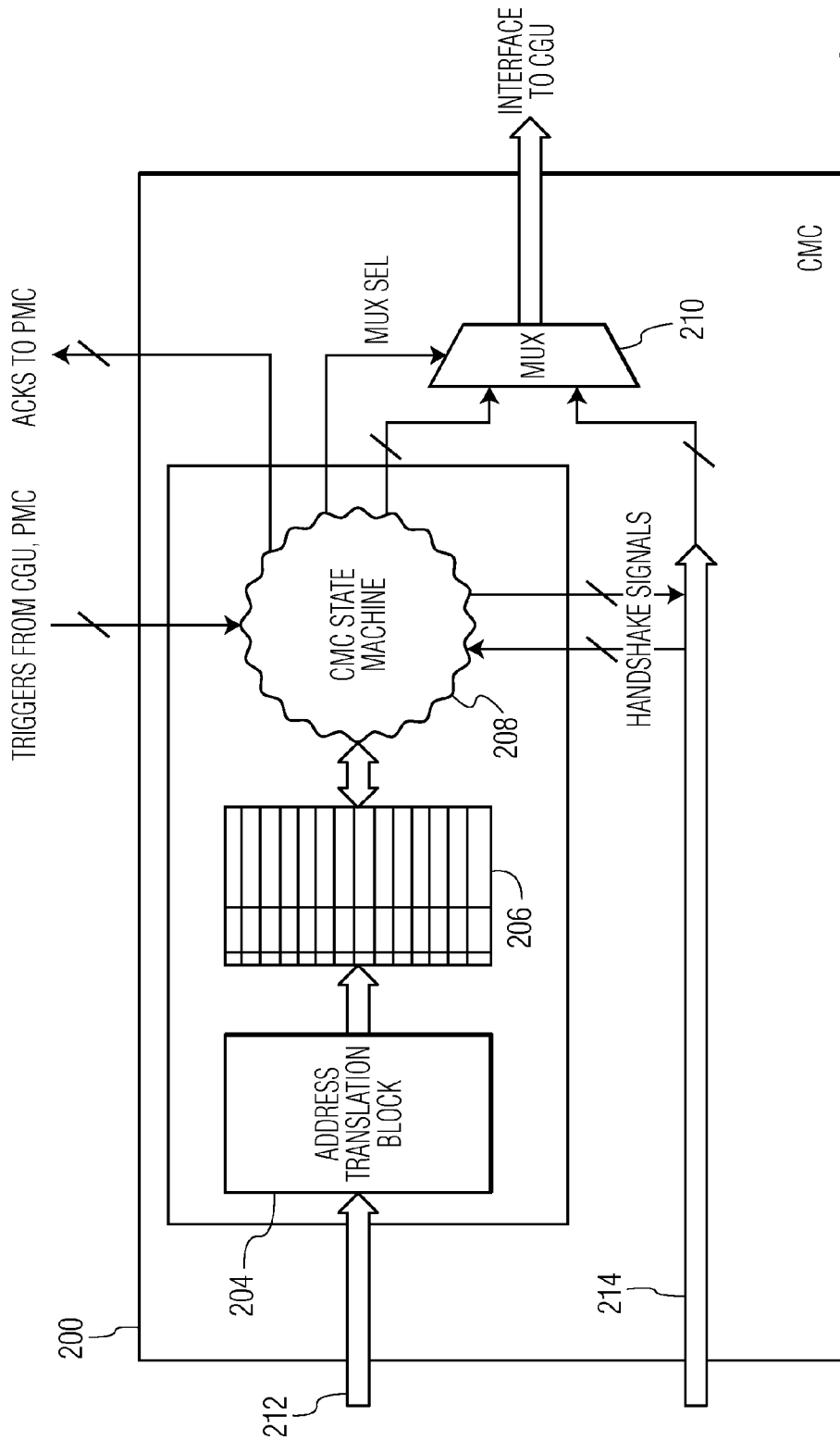
FIG. 2 shows a clock management controller (CMC), according to an example embodiment of the present invention.

FIG. 2 shows a clock management controller (CMC), according to an example embodiment of the present invention. CMC 200 receives data from data paths (ports) 212 and 214. These data paths can be implemented using a number of different protocols including, but not limited to, advanced peripheral bus (APB), advanced high-performance bus (AHB), or device transfer level (DTL).

Data from data path (Programming port) 212 is received by address translation block 204. Address translation block 204 determines the appropriate location to store received information within memory 206. In a particular instance, memory 206 contains a plurality of data segments that each corresponds to a respective set of one or more clock signal outputs of the CGU. The data segments can have similar format to one another. This can be particularly useful for allowing software driver(s) to use similar data formats for each of the data segments. For example, a software driver can write to a first data segment and a second data segment using the same data block. The address translation block 204 can use an offset to place the received data in the correct data segment. Thus, the software driver can operate without the need for specific knowledge of the memory configurations within the CMC. This can also be useful for reducing or eliminating the need for the software driver's knowledge of the other data segments.

State machine 208 controls data written to the CGU. State machine 208 can be responsive to various inputs, including triggers/requests from the processing system or the CGU. In a particular instance, the processing system begins a power-control change process by activating a trigger to state machine 208. State machine 208 accesses a memory location of memory 206 that corresponds to the received trigger. The memory location can be a data set that includes data for writing to the CGU and instructions used to determine how to write the data (e.g., handshakes, delays and sequence of data writes). In one embodiment of the invention, state machine 208 includes a number of smaller state machines that correspond to a set of each trigger/acknowledge signals.

The data from data path (port) 214 can be written directly to the CGU. This can be useful for transparent/direct access to the CGU, thereby effectively bypassing the CMC. Due to arbitration and timing issues, the writes data received on data path 214 can be stored in a temporary register or memory. This allows multiplexer 210 to be used with a single interface to the CGU, thereby selectively providing data from one of the data paths to the CGU. Handshake signals from data path 214 can be used to control multiplexer 210.

A specific implementation of the address translation block involves an offset-based addressing scheme used in an example system. When an address is accessed (written to) in the CMC, each access contains three parts to be stored in the memory lookup table. These parts include the opcode, the address and the data. The opcode indicates the type of access, such as an ordinary write to the CGU or a special function (e.g., jump, delay, acknowledge or done). The data field contains any data to be written to the CGU. The address field contains the address where the data is to be written. The memory lookup table is partitioned into a number of sections matching the number of power management controller (PMC)-CMC Control Loop state machines, each of which can have one or more triggers and acknowledgements. In this example there are 3 PMC-CMC Control Loop triggers, and hence, the memory lookup table is divided into 3 parts. The starting addresses for each PMC-CMC Control Loop trigger is stored in the CMC memory as a (STA) register value. The first register write to the programming port within the allocated address range of a trigger will be stored in the memory lookup table at the starting address specified in that PMC-CMC Control Loop trigger's STA register. Each successive write within that trigger's address range will be written to the successive location within the memory lookup table. For example, if the STA register for PMC-CMC Control Loop 0 is set at 0x08, then the write information for the first write is stored at memory lookup table address 0x08 and the next write information is stored at memory lookup table 0x09. A pointer is used for each loop to keep track of the current memory lookup table address to be used.

For each write on the Programming port, the memory lookup table stores the data being written to the corresponding CGU address, the CGU address, and the opcode defining the operation that the CMC has to perform. The CMC reads the opcode and determines if the operation is a simple write to the CGU, or a special function, such as those functions/instructions identified herein.

Thus, a write of data 0x01 as the first instruction to the Programming port that is intended for PMC-CMC Control Loop trigger 1 and for RCG0_S (at address offset 0x101C) can be accomplished in the following manner. The programming port on the CMC receives a write instruction for address 0x101C, with write data of 0x01. If the STA register for PMC-CMC Control Loop trigger 1 has been set to 0x11, the 32 bit data portion of the received instruction (i.e., 0x01) is written to first 32 bits at register memory address 0x11 (the STA for PMC-CMC Control Loop trigger 1). The next 12 bits (i.e. 0x001C) are written as address information for a future CGU access. The next bit gets the operational code (opcode) for this access. As this is not a special instruction for PMC-CMC Control Loop trigger 0, (i.e., not an access to address offset 0x1F00, 0x1F04 or 0x1F08 within the CMC), the opcode field is set to 0. A subsequent write of data 0x402 to RCG0_C (at address offset 0x1020) would be accomplished in the following manner. In the lookup table, the pointer for loop 1 would have been incremented to address offset 0x12. Thus, the instruction is stored at this address offset, in a manner similar to the first write process.

For a special function write, such as 0x1F12003 at address 0x1F04, the operational code (opcode) bit is flagged as a 1 and the address field in the memory lookup table is not used. The special instructions, (e.g., jump, delay, acknowledge and done) are inserted into the lookup table when the port address 0XnF04 is addressed, where n is the PMC-CMC Control Loop trigger number. The data written corresponds to the type of special function/instruction. For example, a jump could be 0x1; a delay could be 0x2; an acknowledge could be 0x3, and a done could be any of the remaining bits.

The special instructions can contain additional data as well. For example, a jump instruction can contain a jump location or offset. In a specific instance, the jump instruction can also include conditional information, such as masks to select a jump in response to a specific trigger or acknowledge condition. In another example, the delay instruction could contain data representing the length of the delay. The use of such a small, specially selected instruction set can be particularly useful for low power and/or low circuit area applications.

These examples are not meant to be limiting and can be implemented using, among other things, a number of different interfaces, ports, register definitions and addressing spaces, the specifics of which are not discussed in more detail herein for the sake of brevity.

Figure 3:
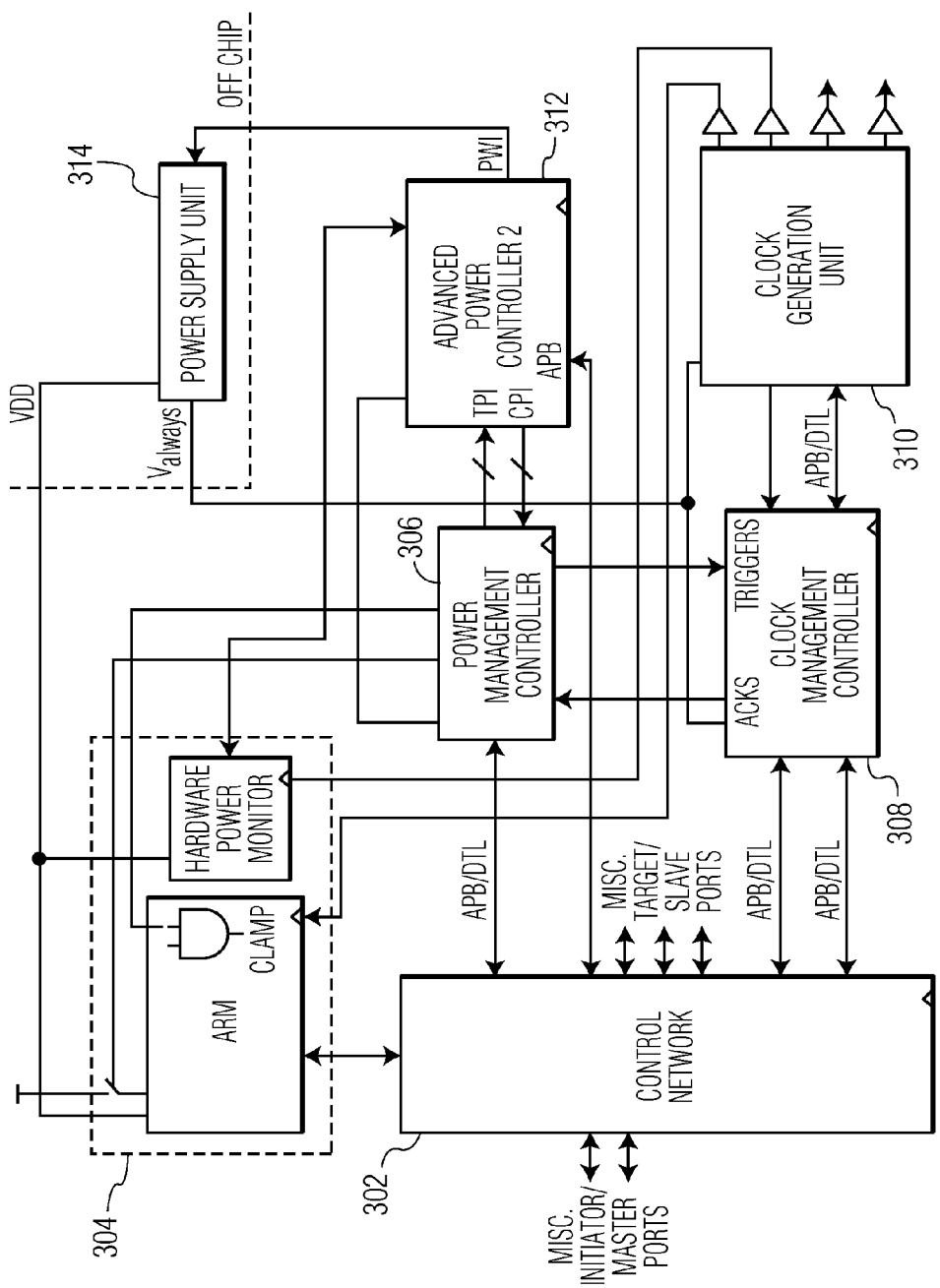
FIG. 3 shows a block diagram of a microprocessor system that includes a clock management unit, according to an example embodiment of the present invention.

FIG. 3 shows a block diagram of a microprocessor system that includes a clock management unit, according to an example embodiment of the present invention. A microprocessor arrangement 304 communicates through control network 302. The microprocessor arrangement includes a microprocessor, such as an ARM processor, and a hardware power monitor. Power supply unit 314 provides power to various devices. In some instances, power supply unit 314 can be configured to change voltages pursuant to corresponding changes in power states of the devices to which it provides power. Advanced power controller 312 and power management controller 306 coordinate power states of the microprocessor system. In a specific example, the hardware power monitor provides power state information, such as the workload of the ARM processor in cycles per instruction (CPI), to advanced power controller 312. Advanced power controller 312 can issue power-state changes for the ARM processor through changes to voltages provided by power supply unit 314 and to the clock signals provided by CGU 310. More specifically, advanced power controller 312 can provide an indication of a power state change to power management controller 306. Power management controller 306 can then initiate the proper transition of clock signals through the use of trigger signals to the CMC 308. Data received through control network 302 configures CMC 308 to provide the appropriate data and control functions to CGU 310. Similar procedures can be used to control clocks provided to various other devices in the system.

The top DTL port/interface of the CMC is used for programming the CGU with power saving features, and is called the Programming port. Commands destined for the CGU that are sent to the Programming port are stored within the CMC. Based on the PMC-CMC Control Loop trigger events from the CGU or PMC into the CMC, certain commands are then written to the CGU. The order of the commands to be written to the CGU is determined by the CMC State Machine and based on the PMC-CMC Control Loop triggers.

Figure 4:
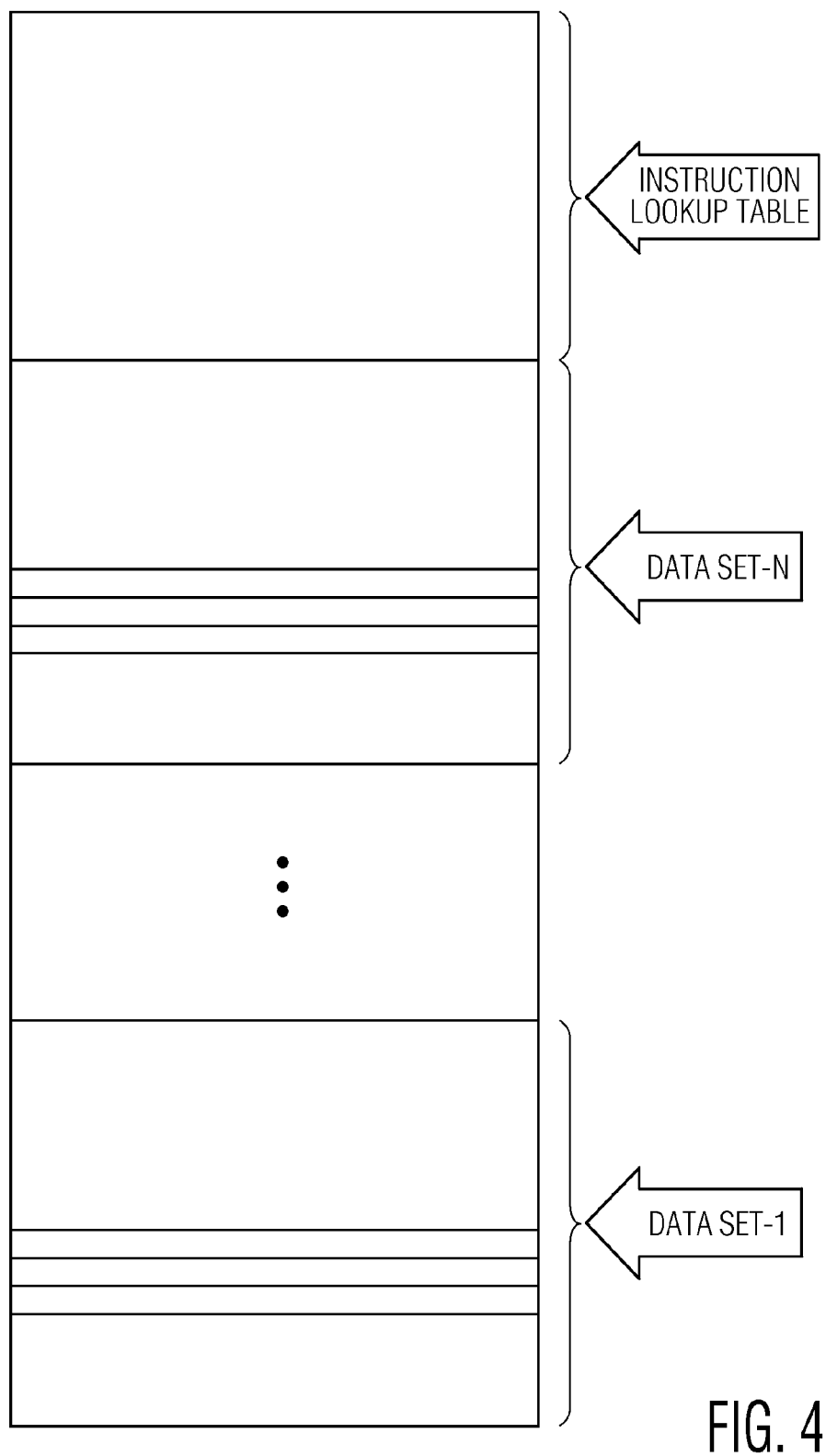
FIG. 4 shows an example of memory configuration for use in a CMC, according to an example embodiment of the present invention.

FIG. 4 shows an example of memory configuration for use in a CMC, according to an example embodiment of the present invention. The memory is arranged as a series of data set. Each data set has a similar format, which includes a duplicate of the CGU address/registers space and instruction information for the CMC state machine to execute. The memory can also include an instruction lookup table that is used to determine where the current instruction for each data segment is located. In a particular instance, the data segments are arranged with an offset corresponding to a respective trigger.

In a specific implementation, the CMC address map includes a duplication of the CGU address map, a few additional registers, and the Memory Instruction Lookup Table. Thus, the processor system to CMC interface (programming port) is a superset of the CGU software interface. Each PMC-CMC Control Loop can be implemented using an address space (e.g., 4 k). In addition to each address space, a Memory Instruction Lookup Table contributes another portion (e.g., 4 k). Thus, if there are two PMC-CMC Control Loops, the programming port address space will be 12 k, while for three PMC-CMC Control Loops, the address space will be size 16 k.

A module ID read performed on the Programming port will return the CMC module ID. However, the address map of this port is derived from the address map of the CGU, and replicates the CGU address map as many times as there are PMC-CMC Control Loop triggers. Assuming 3 PMC-CMC Control Loop triggers, a write to address 0x0000 on the Programming port will be translated to a write for register (RCD0) that is located at address 0 in the CGU ant that is based on PMC-CMC Control Loop trigger 0. A write to Programming port's address 0x1000 will be a write to register RCD0 in the CGU based on PMC-CMC DVFS Control Loop trigger 1, and a write to address 0x2000 will be a write to register RCD0 in the CGU based on PMC-CMC Control Loop trigger 2.

For the case where there is more than one PMC-CMC Control Loop, the state machine is responsible for determining, through an arbitration scheme, which of the PMC-CMC Control Loops should have access to the CMC CGU port that is used to write to the CGU. This arbitration scheme can be selected from any number of suitable schemes including, but not limited to, a round-robin scheme.

Figure 5:
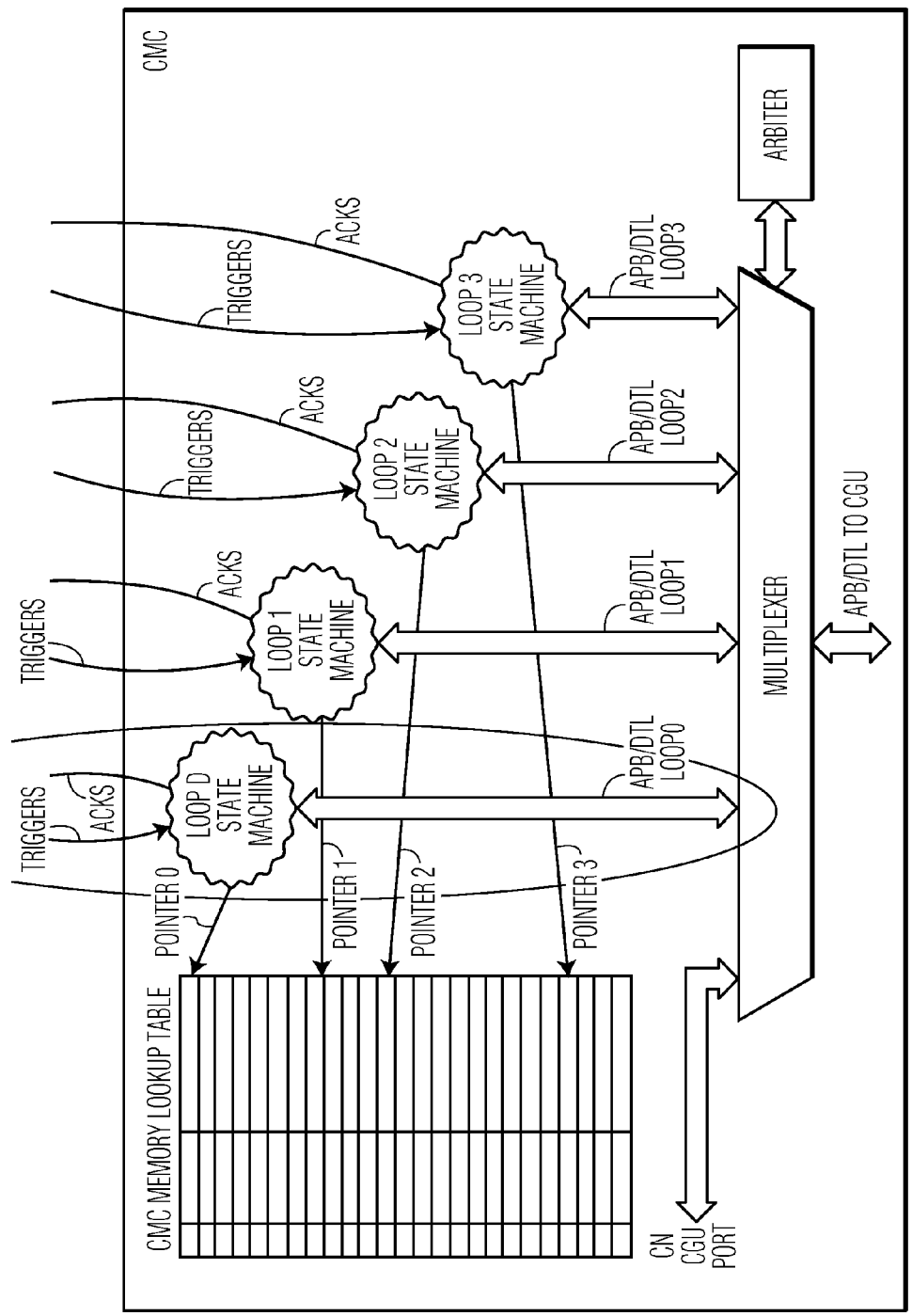
FIG. 5 shows a CMC State Machine module consisting of smaller state machines that access the memory lookup table generated by the address translation block, according to an example embodiment of the present invention.

FIG. 5 shows a CMC State Machine module consisting of smaller state machines that access the memory lookup table generated by the address translation block, according to an example embodiment of the present invention. The interactions between the CMC with the PMC is controlled through a combination of a multiplexer and arbiter. FIG. 5 shows only 4 control loops, however, more or less can be implemented as desired.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, applications other than microprocessors may be amenable to implementation using similar approaches. In addition, one or more of the above example embodiments and implementations may be implemented with a variety of approaches, including digital and/or analog circuitry and/or software-based approaches. The above example embodiments and implementations may also be integrated with a variety of circuits, devices, systems and approaches including those for use in connection with cellular phones, laptop computers and handheld computing devices. These approaches are implemented in connection with various example embodiments of the present invention. Such modifications and changes do not depart from the true scope of the present invention that is set forth in the following claims.

What is claimed is:

1. A clock transitioning circuit arrangement comprising:
a memory circuit for storing at least write instructions received from a processor system, the write instructions indicating a scheme to write data to a clock generation unit, the clock generation unit configured to generate a plurality of clock signals according to the data, the write instructions including information for handshakes, delays, and sequence of data associated with the scheme; and
a control circuit between the clock generation unit and the memory circuit, the control circuit configured to receive the write instructions in response to receiving a trigger, and to write the data to the clock generation unit according to the scheme to change the at least one of the clock signals.

2. The arrangement of claim 1, wherein the control circuit includes a plurality of trigger inputs, each trigger input used to request a change in at least one of the clock signals generated by the clock generation unit.

3. The arrangement of claim 2, wherein the control circuit is configured to access a different portion of the memory circuit in response to receiving the trigger from a different trigger input.

4. The arrangement of claim 1, wherein the control circuit is further configured to execute the write instructions to change at least one of the clock signals generated by the clock generation unit.

5. The arrangement of claim 4, wherein the control circuit maintains an address pointer to the memory circuit for a first clock signal of the plurality of clock signals and a different address pointer to the memory circuit for a second clock signal of the plurality of clock signals.

6. The arrangement of claim 1, further comprising
a plurality of state machines, each state machine controlling one clock signal of the plurality of clock signals; and
an arbiter for selecting one of the plurality of state machines to be accessed by the clock generation unit.

7. The arrangement of claim 6, further comprising a data path for sending information from the processor system to the clock generation unit without receiving the trigger and wherein the arbiter is capable of selecting the data path thereby allowing access to the clock generation unit.

8. A method comprising:
storing at least write instructions received from a processor system, the write instructions indicating a scheme to write data to a clock generation unit for generating a plurality for clock signals according to the data; the write instructions including information for handshakes, delays, and sequence of data associated with the scheme;
receiving the write instructions to change at least one of the clock signals generated by the clock generation unit in response to receiving a trigger; and
writing the data to the clock generation unit according to the scheme to change the at least one of the clock signals.

9. The method of claim 8, wherein receiving the write instructions includes selecting an address location corresponding to a request input of a plurality of request inputs, wherein each request input corresponds to a respective clock signal of the plurality of clock signals.

10. The method of claim 8, further comprising storing an address pointer to the memory circuit for a first clock signal of the plurality of clock signals and a different address pointer to the memory circuit for a second clock signal of the plurality of clock signals, wherein the write instructions are received responsive to selecting one of the address pointers.

11. The method of claim 8, further comprising receiving another trigger to change a different clock signal from the plurality of clock signals and providing arbitration for the requests to allow accesses to the clock generation unit.

12. The method of claim 11, further comprising sending information from the processor system to the clock generation unit without using the trigger.

13. The method of claim 8, wherein the write instructions are stored in a format that duplicates a local memory of the clock generation unit.

14. The method of claim 8, wherein storing at least the write instructions includes storing at least the write instructions according to an offset indicated by the trigger, wherein each trigger of a plurality of triggers is associated with a respective offset.

15. The method of claim 8, wherein one of the write instructions is a jump instruction that implements a jump conditional on one or more external signals as selected by a conditional statement.

* * * * *